(12) United States Patent
Elliott et al.

(10) Patent No.: US 10,233,647 B2
(45) Date of Patent: Mar. 19, 2019

(54) GUTTER HANGER ASSEMBLY

(71) Applicant: OMNIMAX INTERNATIONAL, INC., Norcross, GA (US)

(72) Inventors: Benjamin R. Elliott, Chattanooga, TN (US); Timothy Bilbo, Atlanta, GA (US); Gregory J. Foster, Chicago, IL (US); Robert W. Sheldon, Winnetka, IL (US); Donald Stephen Gazdick, III, Suwanee, GA (US)

(73) Assignee: OmniMax International, Inc., Norcross, GA (US)

( * ) Notice: Subject to any disclaimer, the term of this patent is extended or adjusted under 35 U.S.C. 154(b) by 0 days.

(21) Appl. No.: 15/694,274

(22) Filed: Sep. 1, 2017

(65) Prior Publication Data
US 2018/0066437 A1    Mar. 8, 2018

Related U.S. Application Data (60) Provisional application No. 62/383,184, filed on Sep. 2, 2016.

(51) Int. Cl.
| | |
|---|---|
| *E04D 13/00* | (2006.01) |
| *E04D 13/072* | (2006.01) |
| *F16B 2/22* | (2006.01) |
| *E04D 13/068* | (2006.01) |

(52) U.S. Cl.
CPC ............ *E04D 13/0725* (2013.01); *F16B 2/22* (2013.01); *E04D 13/068* (2013.01)

(58) Field of Classification Search
CPC . E04D 13/0725; E04D 13/076; E04D 13/064; E04D 13/0685; F16B 2/22

USPC ..... 248/48.1, 48.2, 231.91, 248, 903, 216.1, 248/547; 52/11, 12, 18, 13, 15, 16
See application file for complete search history.

(56) References Cited

U.S. PATENT DOCUMENTS

| | | | | |
|---|---|---|---|---|
| 4,294,422 | A * | 10/1981 | Odekirk | E04D 13/0725 248/216.1 |
| 6,254,039 | B1 * | 7/2001 | Zimmerman | E04D 13/0725 248/48.1 |
| 6,543,729 | B1 * | 4/2003 | Ylonen | E04D 13/0725 248/48.1 |
| 6,726,155 | B1 * | 4/2004 | Zimmerman | E04D 13/0725 248/48.1 |

(Continued)

OTHER PUBLICATIONS

Amerimax, Product Catalog, Available online at: http://www.amerimax.com/pdf/catalog/2012%20 Amerimax% 20 catalog% 20complete.pdf 2012, 92 pages.

(Continued)

*Primary Examiner* — Tan Le
(74) *Attorney, Agent, or Firm* — Kilpatrick Townsend & Stockton LLP (57) ABSTRACT

A universal gutter hanger assembly includes a hanger body having a front end and a back end. A front attachment feature at the front end of the hanger body is configured to engage with a front end of the gutter. A back attachment feature at the back end is configured to engage with a back end of the gutter. The back attachment includes a clip extending upwardly from the back end and configured to engage with gutters having various configurations of back ends. In some examples, the hanger body includes an arcuate-shaped bottom surface that extends from the front end to the back end.

19 Claims, 6 Drawing Sheets

(56) References Cited

U.S. PATENT DOCUMENTS

| | | | |
|---|---|---|---|
| 7,494,095 B2* | 2/2009 | Walker | E04D 13/0725 |
| | | | 248/48.2 |
| 8,347,557 B2* | 1/2013 | Minor, Sr. | E04D 13/076 |
| | | | 52/11 |
| 2014/0196400 A1 | 7/2014 | Bell | |

OTHER PUBLICATIONS

Berger, Product Catalog, Available online at: http://www.ceceguip.com/files/CATALOGUE% 20CST% 20BERGER %202012%20_C2012-CA-001.pdf 2012, 40 pages.

CA 2,978,241, "Office Action," dated Oct. 26, 2018, 7 pages.

\* cited by examiner

GUTTER HANGER ASSEMBLY

REFERENCE TO RELATED APPLICATION

This application claims the benefit of U.S. Provisional Application No. 62/383,184, filed Sep. 2, 2016 and entitled GUTTER HANGER ASSEMBLY, the content of which is hereby incorporated by reference in its entirety.

FIELD OF THE INVENTION

This application relates to gutter systems, and more particularly to gutter hanger assemblies for attaching a gutter to a structure such as a house, building, or other structure.

BACKGROUND

Many types of gutters are available for carrying rainwater away from a structure such as a house or building. A common type of gutter is the K-style gutter. Typical K-style gutters have either a straight back attachment site or a hem back attachment site depending on the gutter manufacturer and the region where the gutter is sold. Because of the two different attachment sites found of these gutters, two different styles of gutter hanger assemblies are currently needed depending on the type of gutter to which they are attached. In particular, the K-style gutter with a straight back attachment site uses a gutter hanger assembly with a clip that slips over the straight back attachment site. On the other hand, the K-style gutter with the hem back attachment site uses a gutter hanger assembly without a clip such that a straight end of the gutter hanger assembly slides under a hem that projects from the hem back attachment site.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, gutter hanger assembly includes a hanger body, a front attachment feature at a front end of the hanger body, and a back attachment feature at a back end of the hanger body. The front attachment feature is configured to engage with a front end of a gutter and the back attachment feature is configured to engage with a back end of the gutter. In some aspects, the back attachment feature includes a clip extending upwardly from the back end. In certain examples, the clip includes a clip end, a curved lip between the clip end and the back end of the hanger body, a first back portion between the curved lip and the back end of the hanger body, and a second back portion between the first back portion and the back end of the hanger body. In some examples, the first back portion is horizontally offset from the second back portion.

According to certain examples, a gutter hanger assembly includes a hanger body having a front end, a back end opposite the front end, a top edge extending from the front end to the back end, and a bottom edge opposite the top edge and extending from the front end to the back end. In some cases, the bottom edge is arcuate-shaped such that when the hanger body is positioned on a gutter, a middle portion of the bottom edge is at a vertical position above the bottom edge at the front end and above the bottom edge at the back end. In certain examples, a front attachment feature is at the front end of the hanger body and is configured to engage with a front end of the gutter. In various cases, a back attachment feature is at the back end and is configured to engage with a back end of the gutter.

According to certain cases, a gutter hanger assembly includes a hanger body having a front end, a back end opposite the front end, and a bottom edge extending from the front end to the back end. In some cases, the bottom edge is arcuate-shaped such that when the hanger body is positioned on a gutter, a middle portion of the bottom edge is at a vertical position above the bottom edge at the front end and above the bottom edge at the back end. In various examples, a front attachment feature is at the front end and is configured to engage with a front end of the gutter. In certain cases, a back attachment feature is at the back end and is configured to engage with a back end of the gutter. In various examples, the back attachment feature includes a clip extending upwardly from the back end and having a clip end, a curved lip between the clip end and the back end of the hanger body, a first back portion between the curved lip and the back end of the hanger body, and a second back portion between the first back portion and the back end of the hanger body. In various aspects, the first back portion is horizontally offset from the second back portion.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

In one aspect, disclosed is a universal gutter hanger assembly for gutters having a variety of back attachment sites. In some examples, the gutter hanger assembly is configured for use with a gutter having a straight back attachment site and also for use with a gutter having a hem back attachment site. In some examples, the gutter hanger assembly includes a back attachment feature that is configured to interface with gutters having a straight back attachment site, such as the gutter shown in FIG. 1 and with gutters having a hem back attachment site, such as the gutter shown in FIG. 2.

Figure 1:
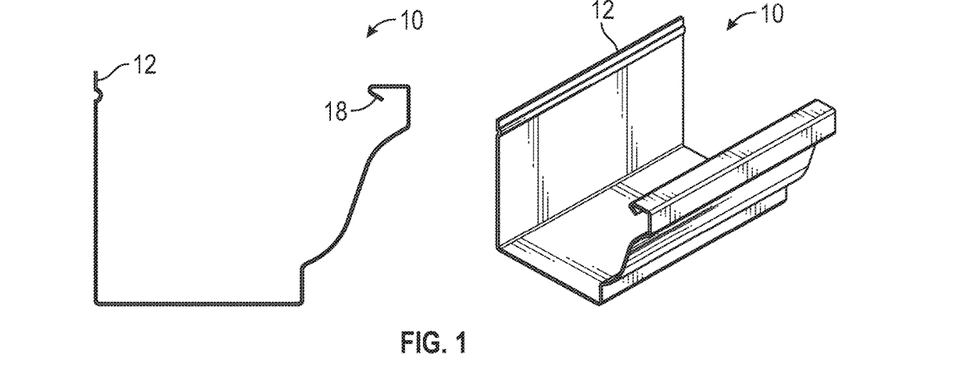
FIG. 1 illustrates an example of a K-style gutter with a straight back attachment site.
Figure 2:
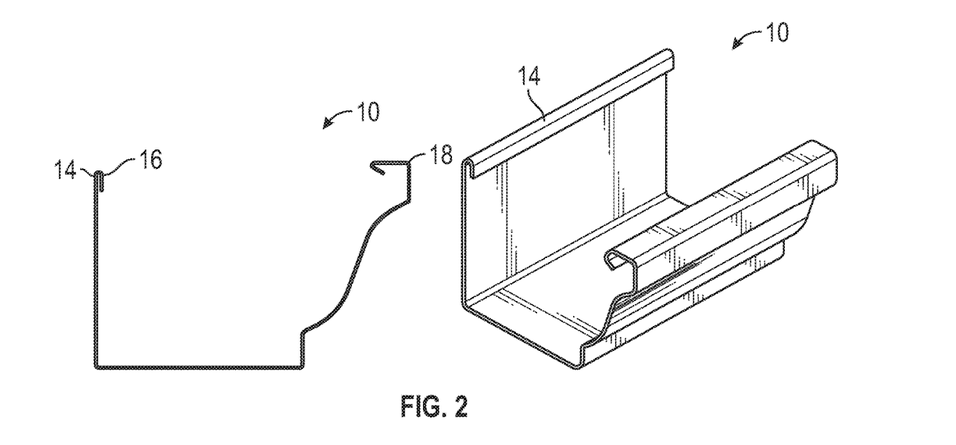
FIG. 2 illustrates an example of a K-style gutter with a hem back attachment site.
Figure 3:
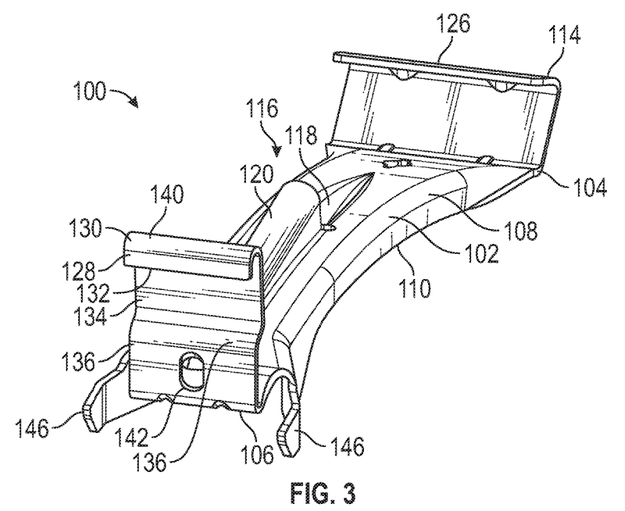
FIG. 3 is a perspective view of a gutter hanger assembly according to aspects of the current disclosure.
Figure 4:
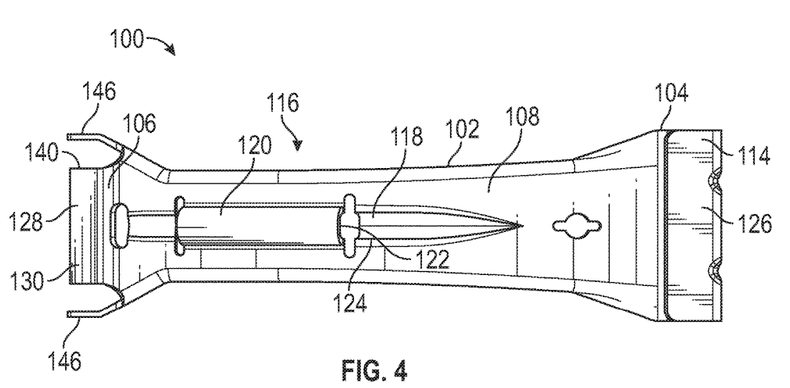
FIG. 4 is a top view of the gutter hanger assembly of FIG. 3.

FIG. 1 illustrates a gutter 10 with a straight back attachment site 12, while FIG. 2 illustrates the gutter 10 with a hem back attachment site 14 having a hem 16. The gutter 10 includes a front end 18 and a back end 11. FIGS. 3-6 illustrate an example of a gutter hanger assembly 100. The gutter hanger assembly 100 includes a hanger body 102 having a front end 104 and a back end 106. A top surface 108 extends from the front end 104 to the back end 106. Similarly, a bottom surface 110 extends from the front end 104 to the back end 106. In various examples, a width of the hanger body 102 at the front end 104 is greater than a width of the hanger body 102 at a middle portion between the front end 104 and the back end 106, although it need not be. In certain examples, a width of the hanger body 102 at the back end 106 is greater than the width of the hanger body 102 at the middle portion, although it need not be. In some cases, the width of the hanger body 102 at the front end 104 is approximately equal to the width of the hanger body 102 at the back end 106, although it need not be. For example, in other cases, the width of the hanger body 102 at the front end 104 may be less than or greater than the width of the hanger body 102 at the back end 106.

Figure 5:
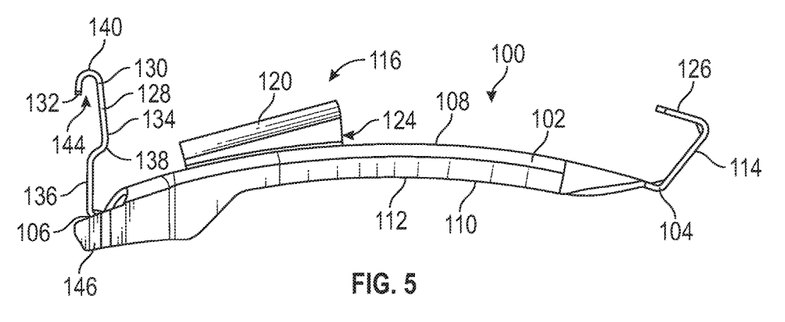
FIG. 5 is a side view of the gutter hanger assembly of FIG. 3.
Figure 6:
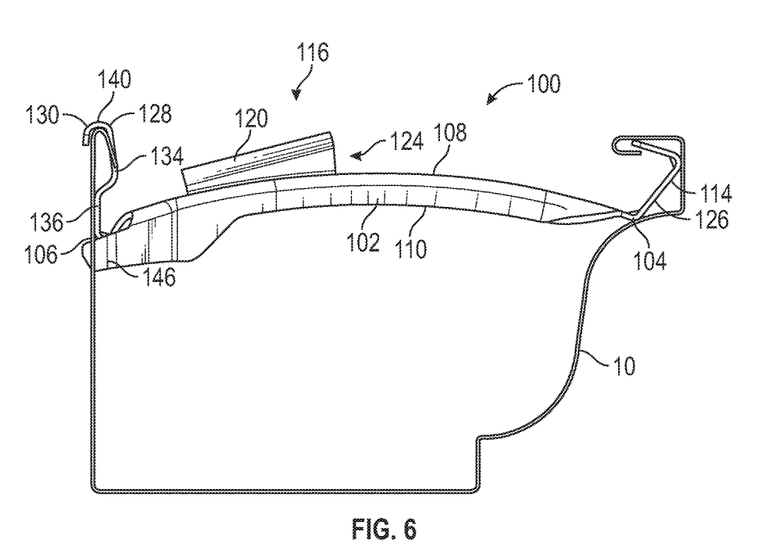
FIG. 6 is a side view of the gutter hanger assembly of FIG. 3 positioned on the K-style gutter of FIG. 2.

As illustrated in FIG. 5, in certain examples, the bottom surface 110 is arcuate-shaped as the bottom surface 110 extends from the front end 104 to the back end 106. In various examples, as illustrated in FIG. 6, the bottom surface 110 is arcuate-shaped such that when the gutter hanger assembly 100 is positioned on the gutter (such as gutter 10 of FIG. 1 or FIG. 2), a middle portion 112 of the bottom surface 110 is at a vertical position above the bottom surface 110 at the front end 104. In certain examples, the middle portion 112 of the bottom surface 110 is also vertically positioned above the bottom surface 110 at the back end 106. In various examples, the bottom surface 110 is arcuate-shaped such that the curvature of the bottom surface 110 is greater than zero. In some examples, both the top surface 108 and the bottom surface 110 are arcuate-shaped.

In some examples, the hanger body 102 includes a fastener guide 116 that is configured to receive a fastener (not shown) for securing the gutter hanger assembly 100 to a structure, such as a building, house, or other structure as desired. In certain aspects, the fastener guide 116 includes a channel 118 defined in at least a portion of the hanger body 102. In some optional examples, the channel 118 extends from a position between the front end 104 and the back end 106 towards the back end 106. In some examples, the fastener guide 116 includes at least one rib 120 extending upward from the hanger body 102 and defining a rib opening 122. In other examples, the fastener guide 116 includes a plurality of ribs 120 (see FIGS. 7-10). In various examples where a plurality of ribs 120 are provided, some of the ribs 120 may extend upward from the hanger body 102 and others of ribs 120 may extend downward from the hanger body 102, although they need not. In certain examples, the rib 120 and/or the rib opening 122 are arcuate shaped, although they need not be. The channel 118 and the rib opening 122 together define a fastener receiving area 124 into which the fastener can be positioned to secure the gutter hanger assembly 100 to a structure.

In various examples, the gutter hanger assembly 100 includes a front attachment feature 114 at the front end 104 of the hanger body 102. The front attachment feature 114 is configured to engage with a front end 18 of the gutter 10 (see FIG. 6). In some examples, as illustrated in FIGS. 3-6, the front attachment feature 114 is configured as a hook 126 extending upwardly from the hanger body 102. The hook 126 is configured to hook around the front end 18 of the gutter 10 to secure the front attachment feature 114 with the front end 18 of the gutter 10. In other examples, the front attachment feature 114 may have various other shapes or configurations suitable for engagement with the front end 18 of the gutter 10.

As illustrated in FIGS. 3-6, in certain examples, the gutter hanger assembly 100 includes a back attachment feature 128 at the back end 106 of the hanger body 102 for attaching to a back end 11 of the gutter 10. In some optional examples, the back attachment feature 128 includes a fastener opening 142. The fastener opening 142 is aligned with the fastener receiving area 124 of the fastener guide 116 such that the fastener may be inserted through the fastener guide 116 and through the back attachment feature 128.

In various examples, the back attachment feature 128 is a clip 130 extending upwardly from the hanger body 102 and having a clip end 132. The clip 130 includes a first back portion 134 between the clip end 132 and the back end 106 and a second back portion 136 between the first back portion 134 and the back end 106. In some examples, a stepped portion 138 is provided between the first back portion 134 and the second back portion 136 such that the first back portion 134 is horizontally offset from the second back portion 136. In certain examples, the first back portion 134 is horizontally offset such that the first back portion 134 at least partially overhangs the top surface 108 of the hanger body 102.

In some examples, the clip 130 includes a curved lip 140 between the first back portion 134 and the clip end 132. In various examples, the clip end 132 is horizontally offset from the first back portion 134 through the curved lip 140. In some examples, the clip end 132 is vertically above the second back portion 136. In other examples, as described in detail below, the clip end 132 need not be positioned vertically above the second back portion 136 (see FIGS. 7-10).

Through the back attachment feature 128, the gutter hanger assembly 100 can accommodate gutters 10 having either the straight back attachment site 12 of FIG. 1 or the hem back attachment site 14 of FIG. 2. When used with gutters 10 having the straight back attachment site 12, the curved lip 140 of the gutter hanger assembly 100 is configured to clip around the straight back attachment site 12. As illustrated in FIG. 6, when used with the gutter 10 having the hem back attachment site 14, the curved lip 140 of the gutter hanger assembly 100 is also configured to clip around the hem back attachment site 14. In various cases, the configuration of the first back portion 134 being horizontally offset from the second back portion 136 allows the curved lip 140 to curve around and clip over the hem 16 of the hem back attachment site 14. In various cases, when the curved lip 140 clips over the hem 16, the second back portion 136 of the gutter hanger assembly 100 abuts the hem back attachment site 14 while the offset first back portion 134 creates a clearance 144 such that the curved lip 140 can clip around the hem 16 of the hem back attachment site 14. In some cases, the first back portion 134 at least partially abuts the hem 16 when the curved lip 140 clips over the hem 16.

According to some optional examples, the gutter hanger assembly 100 includes locking lever arms 146. In certain examples, the locking lever arms 146 are at the back end 106 of the hanger body 102. In various examples, the locking lever arms 146 are a widest extent of the gutter hanger assembly 100, although they need not be. In certain cases, the locking lever arms 146 are provided to extend the overall width of the gutter hanger assembly 100. In optional cases, the locking lever arms 146 may be wider than the gutter 10, although they need not be. In some cases, the locking lever arms 146 create tension between the gutter hanger assembly 100 and the back attachment site 12 or 14 of the gutter 10 when the gutter 10 is pressed up against the structure (building, house, etc.), which locks the back attachment site 12 or 14 of the gutter 10 into the cured lip 140 of the back attachment feature 128. In other examples, the locking lever arms 146 may be omitted (see FIGS. 7-10).

Figure 7:
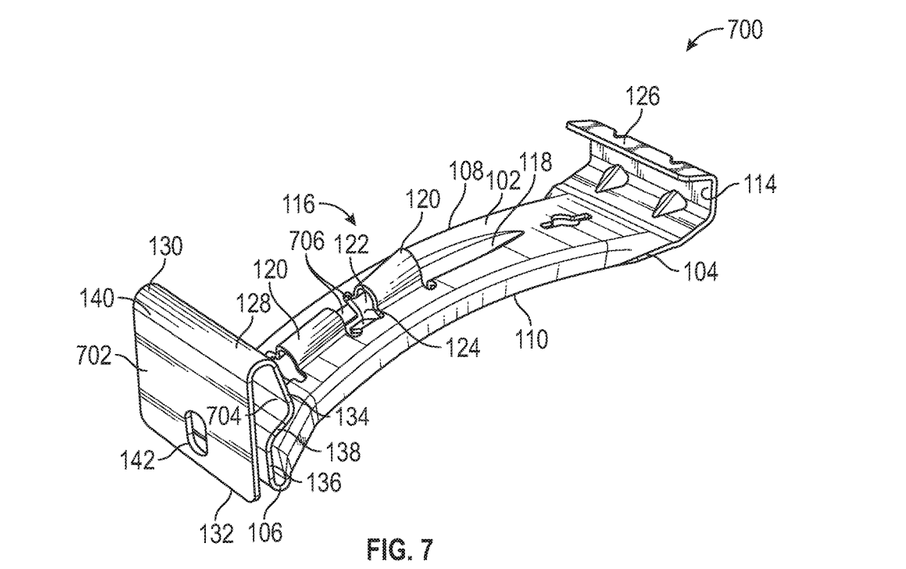
FIG. 7 is a perspective view of a gutter hanger assembly according to aspects of the current disclosure.
Figure 8:
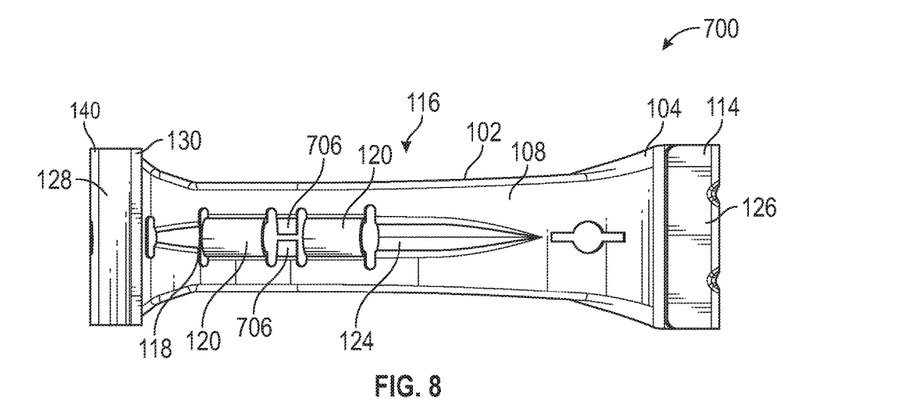
FIG. 8 is a top view of the gutter hanger assembly of FIG. 7.
Figure 9:
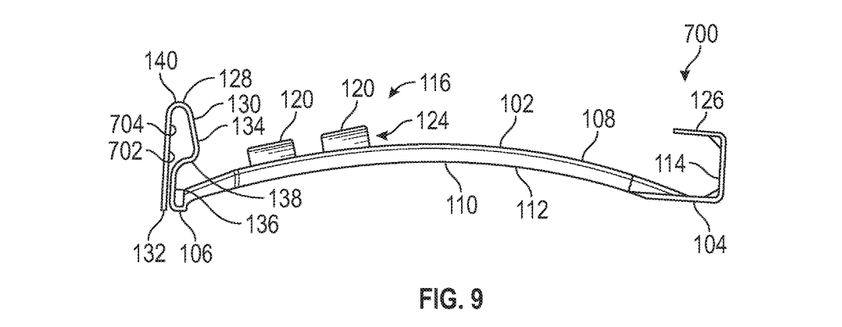
FIG. 9 is a side view of the gutter hanger assembly of FIG. 7.

FIGS. 7-9 illustrate another example of a gutter hanger assembly 700. The gutter hanger assembly 700 is substantially similar to the gutter hanger assembly 100 except that the locking lever arms 146 are omitted and the configuration of the back attachment feature 128 is different. In particular, compared to the gutter hanger assembly 100, the clip end 132 of the back attachment feature 128 of the gutter hanger assembly 700 extends further downward to form a third back portion 702 between the curved lip 140 and the clip end 132. In some examples, the clip end 132 is vertically aligned with the bottom surface 110 at the back end 106, although it need not be.

As illustrated in FIGS. 7-9, in some examples, the third back portion 702 is horizontally offset from the first back portion 134 and the second back portion 136. Optionally, in certain examples, the third back portion 702 is substantially planar, although it need not be. As illustrated in FIGS. 7 and 9, the back attachment feature 128 defines a gutter receiving area 704 between the third back portion 702, the first back portion 134, and the second back portion 136. In some examples, because the first back portion 134 is horizontally offset from the second back portion 136 through the stepped portion 138, a width of the gutter receiving area 704 between the third back portion 702 and the first back portion 134 (or a distance from the third back portion 702 to the first back portion 134) is greater than a width of the gutter receiving area 704 between the third back portion 702 and the second back portion 136.

Compared to the gutter hanger assembly 100, the fastener guide 116 of the gutter hanger assembly 700 includes two ribs 120. The fastener guide 116 of the gutter hanger assembly 700 also includes a pair of optional guide tabs 706 (see FIGS. 7-8). In some examples, the guide tabs 706 are positioned between adjacent ribs 120, although they need not be. In various cases, any desired number of guide tabs 706 may be provided with the fastener guide 116. In some examples, the guide tabs 706 extend downward from the hanger body 102, although they need not. For example, in other cases, the guide tabs 706 may extend upward from the hanger body 102. In certain examples, the guide tabs 706 are configured to provide flexibility to the fastener guide 116 such that the fastener guide 116 can receive various fasteners. For example, in some cases, the guide tabs 706 may deflect upon the insertion of the fastener into the fastener guide 116, although they need not. Optionally, the guide tabs 706 may be biased against the fastener to aid in securing the fastener in place, although they need not be.

Figure 10:
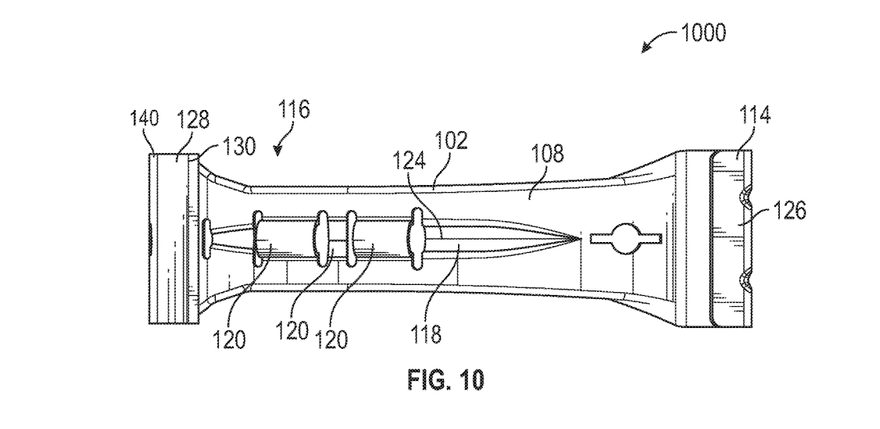
FIG. 10 is a top view of a gutter hanger assembly according to aspects of the current disclosure.
Figure 11:
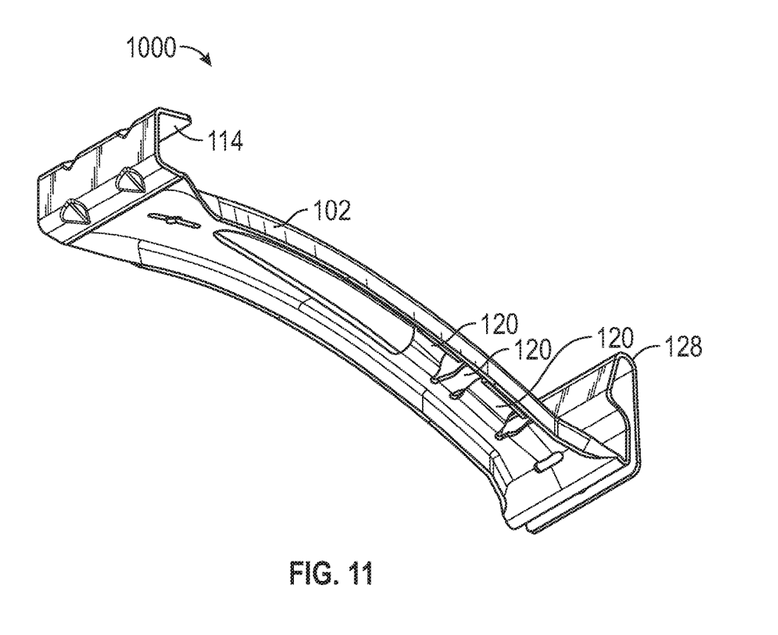
FIG. 11 is a bottom perspective view of the gutter hanger assembly of FIG. 10.

FIGS. 10 and 11 illustrate another example of a gutter hanger assembly 1000. The gutter hanger assembly 1000 is substantially similar to the gutter hanger assembly 700 except that the guide tabs 706 have been replaced with a third rib 120 that extends downward from the hanger body 102. The third rib 120 may have a shape that is substantially similar to the other ribs 120, although it need not. In various examples, compared to the guide tabs 706, the third rib extends completely across the fastener receiving area 124 (e.g., from a first side of the fastener receiving area 124 to a second side of the fastener receiving area 125).

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A gutter hanger assembly comprising: a hanger body comprising a front end and a back end opposite the front end; a front attachment feature at the front end and configured to engage with a front end of a gutter; and a back attachment feature at the back end and configured to engage with a back end of the gutter, wherein the back attachment feature comprises a clip extending upwardly from the back end, wherein the clip comprises: a clip end; a curved lip between the clip end and the back end of the hanger body; a first back portion between the curved lip and the back end of the hanger body; and a second back portion between the first back portion and the back end of the hanger body, wherein the first back portion is horizontally offset from the second back portion.

EC 2. The gutter hanger assembly of any of the preceding or subsequent example combinations, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

EC 3. The gutter hanger assembly of the preceding or subsequent example combinations, wherein a width of the gutter receiving area between the third back portion and the first back portion is greater than a width of the gutter receiving area between the third back portion and the second back portion.

EC 4. The gutter hanger assembly of the preceding or subsequent example combinations, wherein the third back portion is substantially planar.

EC 5. The gutter hanger assembly of the preceding or subsequent example combinations, wherein the clip end is horizontally offset from the first back portion and at a position vertically above the second back portion.

EC 6. The gutter hanger assembly of the preceding or subsequent example combinations, wherein the hanger body further comprises: a top edge extending from the front end to the back end; and a bottom edge opposite the top edge and extending from the front end to the back end, wherein the bottom edge is arcuate-shaped such that when the hanger body is positioned on a gutter, a middle portion of the bottom edge is at a vertical position above the bottom edge at the front end and above the bottom edge at the back end.

EC 7. The gutter hanger assembly of the preceding or subsequent example combinations, wherein the hanger body further comprises a fastener guide configured to receive a fastener for securing the gutter hanger assembly to a structure, wherein the fastener guide comprises: a channel defined in the hanger body; and a rib extending upward from the hanger body and defining a rib opening, wherein the channel and the rib opening define a fastener receiving area.

EC 8. The gutter hanger assembly of the preceding or subsequent example combinations, wherein the clip end is vertically aligned with a bottom edge of the hanger body at the back end of the hanger body.

EC 9. The gutter hanger assembly of the preceding or subsequent example combinations, wherein the first back portion is horizontally offset from the second back portion such that the first back portion at least partially overhangs a portion of the hanger body.

EC 10. A gutter hanger assembly comprising: a hanger body comprising a front end, a back end opposite the front end, a top edge extending from the front end to the back end, and a bottom edge opposite the top edge and extending from the front end to the back end, wherein the bottom edge is arcuate-shaped such that when the hanger body is positioned on a gutter, a middle portion of the bottom edge is at a vertical position above the bottom edge at the front end and above the bottom edge at the back end; a front attachment feature at the front end and configured to engage with a front end of the gutter; and a back attachment feature at the back end and configured to engage with a back end of the gutter.

EC 11. The gutter hanger assembly of the preceding or subsequent example combinations, wherein the back attachment feature comprises a clip extending upwardly from the back end, wherein the clip comprises: a clip end; a curved lip between the clip end and the back end of the hanger body; a first back portion between the curved lip and the back end of the hanger body; and a second back portion between the first back portion and the back end of the hanger body, wherein the first back portion is horizontally offset from the second back portion.

EC 12. The gutter hanger assembly of the preceding or subsequent example combinations, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

EC 13. The gutter hanger assembly of the preceding or subsequent example combinations, wherein the top edge is arcuate-shaped.

EC 14. The gutter hanger assembly of the preceding or subsequent example combinations, wherein the hanger body further comprises a fastener guide configured to receive a fastener for securing the gutter hanger assembly to a structure, and wherein the fastener guide comprises: a channel defined in the hanger body; and a rib extending upward from the hanger body and defining a rib opening, wherein the channel and the rib opening define a fastener receiving area.

EC 15. A gutter hanger assembly comprising: a hanger body comprising a front end, a back end opposite the front end, and a bottom edge extending from the front end to the back end, wherein the bottom edge is arcuate-shaped such that when the hanger body is positioned on a gutter, a middle portion of the bottom edge is at a vertical position above the bottom edge at the front end and above the bottom edge at the back end; a front attachment feature at the front end and configured to engage with a front end of the gutter; and a back attachment feature at the back end and configured to engage with a back end of the gutter, wherein the back attachment feature comprises a clip extending upwardly from the back end, wherein the clip comprises: a clip end; a curved lip between the clip end and the back end of the hanger body; a first back portion between the curved lip and the back end of the hanger body; and a second back portion between the first back portion and the back end of the hanger body, wherein the first back portion is horizontally offset from the second back portion.

EC 16. The gutter hanger assembly of the preceding or subsequent example combinations, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

EC 17. The gutter hanger assembly of claim 16, wherein a width of the gutter receiving area between the third back portion and the first back portion is greater than a width of the gutter receiving area between the third back portion and the second back portion.

EC 18. The gutter hanger assembly of the preceding or subsequent example combinations, wherein the clip end is horizontally offset from the first back portion and at a position vertically above the second back portion.

EC 19. The gutter hanger assembly of the preceding or subsequent example combinations, wherein the clip end is horizontally offset from the first back portion, horizontally offset from the second back portion, and vertically aligned with the bottom edge of the hanger body at the back end of the hanger body.

EC 20. The gutter hanger assembly of the preceding or subsequent example combinations, wherein the first back portion is horizontally offset from the second back portion such that the first back portion at least partially overhangs a portion of the hanger body.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A gutter hanger assembly comprising:
a hanger body comprising a front end and a back end opposite the front end, wherein the hanger body further comprises a fastener guide configured to receive a fastener for securing the gutter hanger assembly to a structure, wherein the fastener guide comprises:
a channel defined in the hanger body; and
a rib extending upward from the hanger body and defining a rib opening, wherein the channel and the rib opening define a fastener receiving area;
a front attachment feature at the front end configured to engage with a front end of a gutter; and
a back attachment feature at the back end configured to engage with a back end of the gutter, wherein the back attachment feature comprises a clip extending upwardly from the back end, wherein the clip comprises:
a clip end;
a curved lip between the clip end and the back end of the hanger body;
a first back portion between the curved lip and the back end of the hanger body; and
a second back portion between the first back portion and the back end of the hanger body,
wherein the first back portion is horizontally offset from the second back portion.

2. The gutter hanger assembly of claim 1, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

3. The gutter hanger assembly of claim 2, wherein a width of the gutter receiving area between the third back portion and the first back portion is greater than a width of the gutter receiving area between the third back portion and the second back portion.

4. The gutter hanger assembly of claim 2, wherein the third back portion is substantially planar.

5. The gutter hanger assembly of claim 1, wherein the clip end is horizontally offset from the first back portion and at a position vertically above the second back portion.

6. The gutter hanger assembly of claim 1, wherein the hanger body further comprises:
a top surface extending from the front end to the back end; and
a bottom surface opposite the top surface and extending from the front end to the back end,
wherein the bottom surface is arcuate-shaped such that when the hanger body is positioned on a gutter, a middle portion of the bottom surface is at a vertical position above the bottom surface at the front end and above the bottom surface at the back end.

7. The gutter hanger assembly of claim 1, wherein the clip end is vertically aligned with a bottom surface of the hanger body at the back end of the hanger body.

8. The gutter hanger assembly of claim 1, wherein the first back portion is horizontally offset from the second back portion such that the first back portion at least partially overhangs a portion of the hanger body.

9. A gutter hanger assembly comprising:
a hanger body comprising a front end, a back end opposite the front end, a top surface extending from the front end to the back end, and a bottom surface opposite the top surface and extending from the front end to the back end, wherein the bottom surface is arcuate-shaped such that when the hanger body is positioned on a gutter, a middle portion of the bottom surface is at a vertical position above the bottom surface at the front end and above the bottom surface at the back end;
a front attachment feature at the front end and configured to engage with a front end of the gutter; and
a back attachment feature at the back end and configured to engage with a back end of the gutter, wherein the back attachment feature comprises a clip extending upwardly from the back end, wherein the clip comprises:
a clip end;
a curved lip between the clip end and the back end of the hanger body;
a first back portion between the curved lip and the back end of the hanger body; and
a second back portion between the first back portion and the back end of the hanger body,
wherein the first back portion is horizontally offset from the second back portion.

10. The gutter hanger assembly of claim 9, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

11. The gutter hanger assembly of claim 10, wherein a width of the gutter receiving area between the third back portion and the first back portion is greater than a width of the gutter receiving area between the third back portion and the second back portion.

12. The gutter hanger assembly of claim 9, wherein the top surface is arcuate-shaped.

13. A gutter hanger assembly comprising:
a hanger body comprising a front end, a back end opposite the front end, and a bottom surface extending from the front end to the back end, wherein the bottom surface is arcuate-shaped such that when the hanger body is positioned on a gutter, a middle portion of the bottom surface is at a vertical position above the bottom surface at the front end and above the bottom surface at the back end;
a front attachment feature at the front end and configured to engage with a front end of the gutter; and
a back attachment feature at the back end and configured to engage with a back end of the gutter, wherein the back attachment feature comprises a clip extending upwardly from the back end, wherein the clip comprises:
a clip end;
a curved lip between the clip end and the back end of the hanger body;

a first back portion between the curved lip and the back end of the hanger body; and a second back portion between the first back portion and the back end of the hanger body, wherein the first back portion is horizontally offset from the second back portion.

14. The gutter hanger assembly of claim 13, wherein the clip further comprises a third back portion between the curved lip and the clip end, wherein the third back portion is horizontally offset from the first back portion and the second back portion, and wherein the clip defines a gutter receiving area between the third back portion and the first back portion and between the third back portion and the second back portion.

15. The gutter hanger assembly of claim 14, wherein a width of the gutter receiving area between the third back portion and the first back portion is greater than a width of the gutter receiving area between the third back portion and the second back portion.

16. The gutter hanger assembly of claim 13, wherein the clip end is horizontally offset from the first back portion and at a position vertically above the second back portion.

17. The gutter hanger assembly of claim 13, wherein the clip end is horizontally offset from the first back portion, horizontally offset from the second back portion, and vertically aligned with the bottom surface of the hanger body at the back end of the hanger body.

18. The gutter hanger assembly of claim 13, wherein the first back portion is horizontally offset from the second back portion such that the first back portion at least partially overhangs a portion of the hanger body.

19. A gutter hanger assembly comprising:

a hanger body comprising a front end and a back end opposite the front end, wherein the hanger body further comprises:

a top surface extending from the front end to the back end; and a bottom surface opposite the top surface and extending from the front end to the back end, wherein the bottom surface is arcuate-shaped such that when the hanger body is positioned on a gutter, a middle portion of the bottom surface is at a vertical position above the bottom surface at the front end and above the bottom surface at the back end;

a front attachment feature at the front end configured to engage with a front end of a gutter; and a back attachment feature at the back end configured to engage with a back end of the gutter, wherein the back attachment feature comprises a clip extending upwardly from the back end, wherein the clip comprises:

a clip end;

a curved lip between the clip end and the back end of the hanger body;

a first back portion between the curved lip and the back end of the hanger body; and a second back portion between the first back portion and the back end of the hanger body, wherein the first back portion is horizontally offset from the second back portion.

* * * * *